H. H. McNEIL.
TROLLEY GUARD.
APPLICATION FILED MAY 29, 1911.
1,028,052.
Patented May 28, 1912.
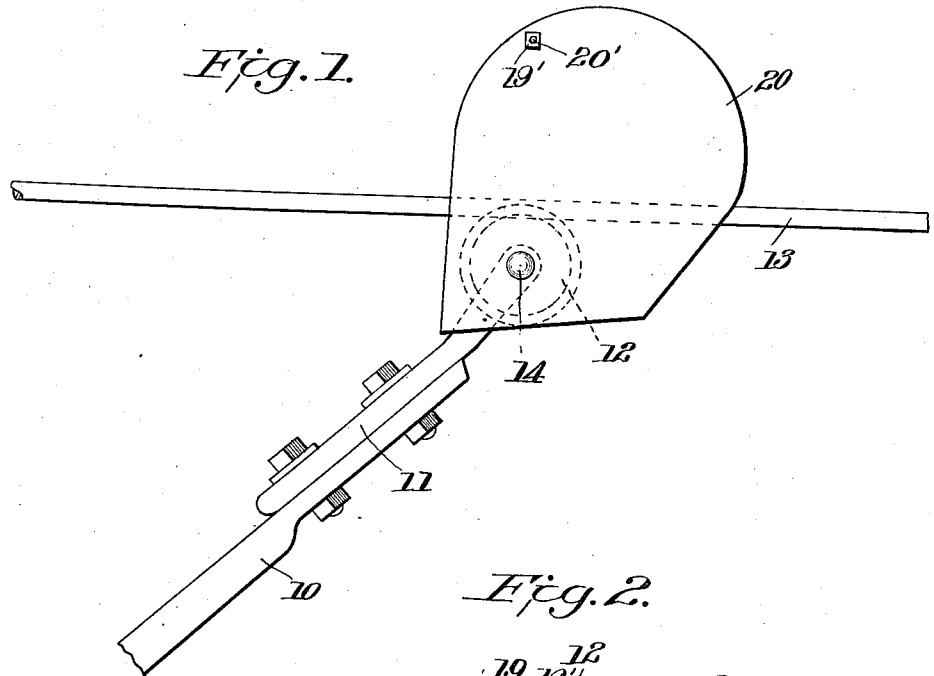
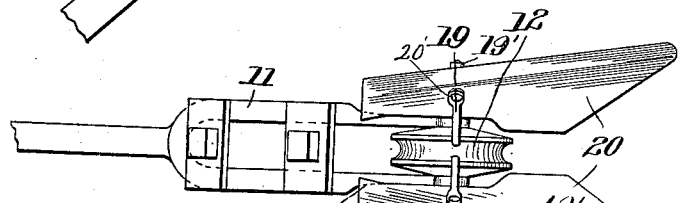
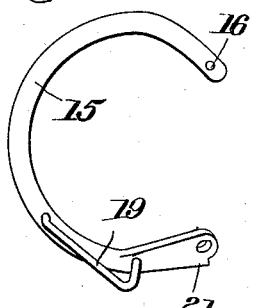
WITNESSES
M Walker.
J. T. Walker.
INVENTOR
H. H. McNeil.
By [signature]
Attorney

UNITED STATES PATENT OFFICE.

HOWARD H. McNEIL, OF NEW FREEDOM, PENNSYLVANIA.

TROLLEY-GUARD.

1,028,052. Specification of Letters Patent. Patented May 28, 1912.

Application filed May 29, 1911. Serial No. 630,250.

*To all whom it may concern:*

Be it known that I, HOWARD H. McNEIL, citizen of the United States, residing at New Freedom, in the county of York and State of Pennsylvania, have invented certain new and useful Improvements in Trolley-Guards, of which the following is a specification.

This invention relates to trolley guards. The object of the invention is to provide a trolley guard embodying such characteristics that lateral displacement of the trolley wheel with respect to the trolley wire is reduced to a minimum and embodying among other characteristics means whereby the positioning of the trolley wheel with relation to the trolley wire or conductor is facilitated so that the trolley wheel may be readily engaged with the trolley wire in daylight or darkness.

With the above and other objects in view the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings: Figure 1 is a side elevation of the invention. Fig. 2 is a top plan view. Fig. 3 is a detail view of one of the guard arms. Fig. 4 is a side elevation of the invention with the casing on one side of the device removed.

Referring now more particularly to the accompanying drawings the reference character 10 indicates the upper portion of a trolley pole to which I secure in any suitable manner a substantially U-shaped yoke 11 in the legs of which at the free ends thereof is journaled a trolley wheel 12 adapted for engagement with the trolley wire 13 in the usual manner and for the usual purposes.

Secured preferably to the journal 14 on which the wheel 12 is disposed, one on each side of the wheel 12, is a curved arm 15, each arm being directed upwardly from the yoke and curved rearwardly and downwardly, as shown. These curved arms have pivotal movement on the journal 14 and have their free ends preferably perforated at 16 to receive one end of a helical or other spring 17, the opposite ends of the springs 17 being preferably connected in the eyes 18 of the legs of the yoke.

To facilitate the engagement of the wheel 12 with the trolley wire or conductor 13 I secure to each arm 14 an inwardly directed projection 19, the inner edges of the projections converging so that the trolley wire or conductor 13 will slide down between the projections and become seated on the trolley wheel 12, whereby the trolley wheel is easily and quickly positioned with respect to the trolley wire. In one embodiment of the invention the projections 19 may be formed of wire or similar material with each end connected to its respective curved arm or if a casing, such as 20, incloses the arms and the springs to exclude ice, sleet and other foreign matter, the upper ends of the projections may be secured to such casings, by means of bolts 20' on the outer ends of which are secured nuts 19'. It will thus be understood that the projections 19 form means for facilitating positioning of the trolley wheel with respect to the trolley wire and that the curved arms serve as guards and with their projections 19 tend to prevent lateral displacement of the wheel with respect to the trolley wire. The springs 17 permit yieldability so that if the device should strike braces on the poles (not shown) the several parts of the device will be caused to assume their original positions without stopping the car to replace them. For instance, by virtue of the pivotal mounting of the curved arms 15 they may wind around on their pivots against the action of the springs 17 which latter become compressed upon backward movement of the arms and which are released and expand immediately upon pressure being taken from the forward end of the arms, there being a stop 21 formed on each arm 15 for engagement with the corresponding leg of the yoke to limit the forward movement of the arms and this forward movement may be reinforced by the inner end of the casing 20 being formed to provide a supplemental stop 22 designated to engage the corresponding leg of the yoke.

From the foregoing it will be seen that I provide a simple, inexpensive, durable and efficient device for connection with a trolley pole to expedite the placing of the wheel on the trolley wire or conductor whether in daylight or darkness and to prevent displacement of the wheel from the trolley wire or conductor when going around curves or in the event of striking obstructions such as connectors between poles and the trolley wires, the device having yieldable parts which position themselves automatically by virtue of which yieldability is permitted when the wheel strikes connections between the poles and wires without deranging the various parts, they assuming their normal positions automatically.

What is claimed is:

A device of the character described comprising a yoke, a wheel mounted in the yoke, a pair of arms secured to the journal of the wheel, spring connections between the free ends of the arms and the yoke and guide members carried by the arms, the springs cushioning the arms in one direction of their movement and the arms having stops for engagement with the yoke to limit the movement of the arms in the opposite direction and a casing disposed over each arm and having a part thereof forming a projection for engagement with the yoke to reinforce the aforesaid stopping means.

In testimony whereof I affix my signature in presence of two witnesses.

HOWARD H. McNEIL.

Witnesses:
WM. E. WILHELM,
J. L. YAGLE.

---

Copies of this patent may be obtained for five cents each, by addressing the "Commissioner of Patents, Washington, D. C."